(12) United States Patent
Metzger et al.

(10) Patent No.: US 6,973,452 B2
(45) Date of Patent: Dec. 6, 2005

(54) LIMITING SCANS OF LOOSELY ORDERED AND/OR GROUPED RELATIONS USING NEARLY ORDERED MAPS

(75) Inventors: John K. Metzger, Westborough, MA (US); Barry M. Zane, Wayland, MA (US); Foster D. Hinshaw, Somerville, MA (US)

(73) Assignee: Netezza Corporation, Framingham, MA (US)

( * ) Notice: Subject to any disclaimer, the term of this patent is extended or adjusted under 35 U.S.C. 154(b) by 0 days.

(21) Appl. No.: 10/847,895

(22) Filed: May 18, 2004

(65) Prior Publication Data

US 2005/0010564 A1 Jan. 13, 2005

Related U.S. Application Data

(60) Provisional application No. 60/471,691, filed on May 19, 2003.

(51) Int. Cl.[7] .............................................. G06F 17/30
(52) U.S. Cl. .......................................... 707/4; 707/101
(58) Field of Search ................... 707/1–10, 100–104.1, 707/200–205; 715/512; 345/723

(56) References Cited

U.S. PATENT DOCUMENTS

| | | | | |
|---|---|---|---|---|
| 4,205,371 A | * | 5/1980 | Feather ........................ | 707/101 |
| 4,914,586 A | * | 4/1990 | Swinehart et al. .......... | 707/101 |
| 5,414,808 A | * | 5/1995 | Williams ..................... | 345/723 |
| 5,560,005 A | * | 9/1996 | Hoover et al. ................ | 707/10 |
| 5,806,079 A | * | 9/1998 | Rivette et al. .............. | 715/512 |
| 6,173,287 B1 | * | 1/2001 | Eberman et al. ............ | 707/102 |
| 6,687,876 B1 | * | 2/2004 | Schilit et al. ............... | 715/512 |

* cited by examiner

Primary Examiner—Mohammad Ali
(74) Attorney, Agent, or Firm—Hamilton Brook Smith & Reynolds, P.C.

(57) ABSTRACT

A large information space is divided into many smaller information extents. These extents are annotated with statistics about the information they contain. When a search for information includes a restriction based on value, the desired value ranges can be compared to the value ranges of each extent. If the desired value range lies outside the range of the extent, then the extent cannot hold the desired value and does not need to be included in the search.

33 Claims, 10 Drawing Sheets

LIMITING SCANS OF LOOSELY ORDERED AND/OR GROUPED RELATIONS USING NEARLY ORDERED MAPS

RELATED APPLICATION

This application claims the benefit of U.S. Provisional Application No. 60/471,691, filed May 19, 2003. The entire teachings of the above application(s) are incorporated herein by reference.

BACKGROUND OF THE INVENTION

Relational database indices typically have an entry for each data record in the target relation. Each entry in these indexes contain a key value and pointer to the data record. These entries are sorted by key value. Embellishments of such indices include maintaining additional data fields in each entry and high-speed access and maintenance methods such as "b-tree"s. These embellishments are often useful in transactional systems where records are typically accessed one at a time. However, they are expensive to maintain and to traverse, especially when searching a large number of records.

SUMMARY OF THE INVENTION

One embodiment of the present invention is a method for quickly reducing the scope of a search for information. Whereas an index specifies where a particular piece of information is, the nearly ordered map of the preferred embodiment of the invention specifies a range or set of ranges where a particular piece of information may be. At first glance, it seems more useful to know with specificity where something is rather than a set of ranges where it may be; however that usefulness depends upon the relative costs of using an index versus using a nearly ordered map, as well as upon the distribution of information and the search method. In certain common and important cases, nearly ordered maps can quickly reduce the scope of a search by two to three orders of magnitude, producing results nearly as quickly or even more quickly than with the use of an index, and at a fraction of the computational and storage cost of maintaining an index.

One embodiment of the invention operates by dividing a large information space into many smaller information extents. These extents are annotated with statistics about the information they contain, in particular, minimum and maximum values (other values such as count are also maintained). When a search for information includes a restriction based on value, the desired value ranges can be compared to the minimum and maximum values of each extent. If the desired value range lies outside the range of the extent, then the extent cannot hold the desired value and thus does not need to be included in the search. If the desired range does overlap the range of a particular extent, then that extent must be searched, even though it may not contain the desired values.

In the following text, we use the term "relation" in the inclusive sense to include tables, views, indices, and other data structures. For simplicity of discussion we use the term "table" interchangeably with "relation". Also note that for ease of description, reference is made to specific types of storage such as "persistent storage" and "memory"; nearly ordered maps work equally well with all other storage types and combinations of types.

More particularly, consider that in many data warehousing applications, a small number of relations take up 80% or more of the size of the database. These can be, for example, relations that record real events in time, events that are typically quite basic and important to an enterprise. In the telecommunication industry, these events might identify individual phone calls or components of phone calls ("call detail records"). For internet sites these events could be data describing individual clicks that users have made. With companies that sell products or services to consumers, these events would be individual purchases at a point of sale, or even a physical path that individual items in a shopping cart may have taken throughout the store. For banks and brokerages these events could be financial transactions.

Across industries and applications, there are certain common features to the way these events are captured and used in a data warehouse. Typically, there are hundreds of millions of events created every day. They usually arrive at the warehouse grouped chronologically, roughly in the order they occur, and fairly soon after they occur. Analyses frequently operate on chronological slices, comparing for example, traffic at different hours of the day, or at different geographical locations at the same time. While analyzing data in chronological slices is common, it isn't the only dimension that exhibits loose ordering and grouping. Satellite images, for example tend to be grouped and analyzed in longitudinal bands.

Because the information in these large relations is critical to the interests of the enterprise, the appetite to store more information is insatiable. Increasing the amount of history that is kept in the table frequently increases the value of the analyses, as predictive patterns have more scope to emerge. In addition, the rate at which new information is captured accelerates at 50% per year in many industries. This means that these tables are big and getting bigger, growing both backwards and forwards in time.

If an enterprise records five hundred million events in a day, and wants to keep one hundred days of history online in its warehouse, that requires keeping fifty billion events maintained online. The nature of the information recorded about these events varies across industries and applications, but could reasonably require one hundred bytes per record. This means that the size of an event table could easily be five terabytes. If those five terabytes were split evenly across five hundred disks, each disk would hold ten gigabytes of event table data. If these disks scanned at a rate of 33 megabytes per second, it would take each disk about five minutes to read its portion of the overall event table. This means that a data warehouse with five hundred disks could handle at most twelve queries per hour that involved the most central and important table. Clearly, this is not an effective solution.

The use of a traditional index, such as a b-tree, alleviates this problem especially when only a few records are being retrieved. For instance, in a transactional system, if a user is retrieving the records for a specific trade then a b-tree index is fairly efficient. However, with queries that retrieve a medium to large number of records, the computational cost of using those indices becomes dominant in the query cost. For instance, some relational database management system (RDBMS) vendors suggest that indices not be used if more that 8% of a given table is being accessed.

One embodiment of the present invention therefore takes advantage of (a) the inherent chronological grouping of events by time within an event table and (b) the common desire to query the event table by chronological slice, to reduce the time and system resource cost required to scan the table and retrieve the requested records by orders of magnitude. Where this works, it increases response time and throughput dramatically. Further, as discussed above, this embodiment of the invention is equally useful in other tables where the records are inherently grouped by fields which are commonly used either in restrict clauses and/or in ordering clauses within a query.

Further, the preferred embodiment of the invention is equally useful for derived relations, especially those where some of the values physically appear in ordered or nearly ordered form. An example of such is a sorted materialized view. A further example is the intermediate relation created during the sort of a table. In this case, if a bucket sort is used to sort a relation, then the data in the buckets created after the $2^{nd}$ sort phase (the "bucketizing" phase) are nearly ordered and benefit from the preferred embodiment of the this invention. The use of nearly ordered maps permits the intermediate table to be used in many operations before the $3^{rd}$ sort phase ("final sort") thereby significantly reducing the time to effectively sort the given relation. This use of a partially sorted relation may not be available with traditional indices.

The key advantage of one embodiment of the invention at the most abstract level relates to reducing the amount of time required to locate a relatively small amount of information within a very large information space in certain important and commonly occurring situations. More specifically, one advantage relates to reducing the portion of a computer disk that must be scanned to locate records of interest.

The most common technique for achieving this kind of advantage is the use of indices. An index is a separate data structure, which maps a set of data values onto a set of records that relate to those data values, most commonly by containing those data values as fields within the records. Database queries take advantage of indices in a two-step process. First, the index is consulted to find the relevant data records. Second, the relevant data records are retrieved.

There are several problems with the prior art's simplistic use of indices to improve query performance, which are avoided by the preferred embodiment of the invention. First, many types of indices require a considerable amount of space. Second, although the time required to use the index is usually a logarithmic function (or better) of the number of records being indexed, this can still require a considerable amount of time for very large numbers of records. Third, changes to the underlying set of records require corresponding changes to the index, which can slow down the time required to load or purge data. With hundreds of millions of records entering and leaving the system each day, additional index maintenance overhead can be a substantial problem. Fourth, there are difficult issues with transactional integrity and concurrency control that arise with the use of indices. Fifth (and probably most significant for a distributed warehouse), when the set of records is split across many disks, it's not always possible to co-locate the portion of the index that maps a given data value with the records that relate to that data value. This means that a network communication is generally required between the steps of using the index to find the relevant data records and then scanning disks for those data records. These extra network communications can double the latency of a query. And, finally, indices require setup and maintenance and judgment to know which index definitions would best serve application queries at the least cost.

Whereas the focus of an index is to quickly determine the location of a set of records, the focus of a nearly ordered map is the opposite of this: to quickly determine the locations that cannot contain a set of records. Partly because of this different focus, the preferred embodiment of the invention uses nearly ordered maps to avoid problems with indices. Very little extra space is required, on the order of 24 bytes per 3 megabytes of record data. Because one embodiment of the invention co-locates nearly ordered maps with the record data they describe, very little extra computational latency is introduced. In a system with intelligence on each of the data nodes, since (a) the nearly ordered maps themselves may be maintained and accessed in that local node memory and (b) the logic for access to the data itself may be self contained within that node, the host computer may be totally ignorant of the local nearly ordered maps leading to a more reliable, more efficient and higher performing system.

Nearly ordered maps are updated in a fashion that keeps the information accurate yet pessimistic, and avoids problems with concurrency control and extra load time. Finally, nearly ordered maps can be maintained automatically, avoiding the need for sophisticated database administration experience.

As with traditional data storage techniques, a large space of information is divided into a series of many smaller segments of information called extents. One central idea is that each extent is annotated with the maximum and minimum values for particular kinds of information occurring in the extent. When a query wishes to scan the large information space for values in particular ranges, the preferred embodiment of the invention first examines the annotations associated with each extent to determine whether that extent could possibly contain values in the desired range. Extents that could not hold values in the desired range are not scanned. Only those extents that could hold values in the desired range are scanned. When data values are grouped tightly within extents, and when queries are relatively selective about the range of values they will accept, the preferred embodiment of the invention can quickly eliminate most of the time required to scan the large space of information.

In a system with intelligence on one or more data nodes, each intelligent node may maintain the annotations for its local storage so that its storage map and annotations may be maintained privately: they may be encapsulated, independent, autonomous, and hidden from any other system element. The result is very fast retrieval without the requirement of maintaining either a centralized or a precise index.

In those cases where few records are retrieved for a given queries, the nearly ordered maps may be augmented with a "root" map which identifies the node or nodes which may contain those records so that the query is sent to only those nodes that may contain the target records.

BRIEF DESCRIPTION OF THE DRAWINGS

The foregoing and other objects, features and advantages of the preferred embodiment of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the preferred embodiment of the invention.

DETAILED DESCRIPTION A PREFERRED EMBODIMENT

Figure 1:
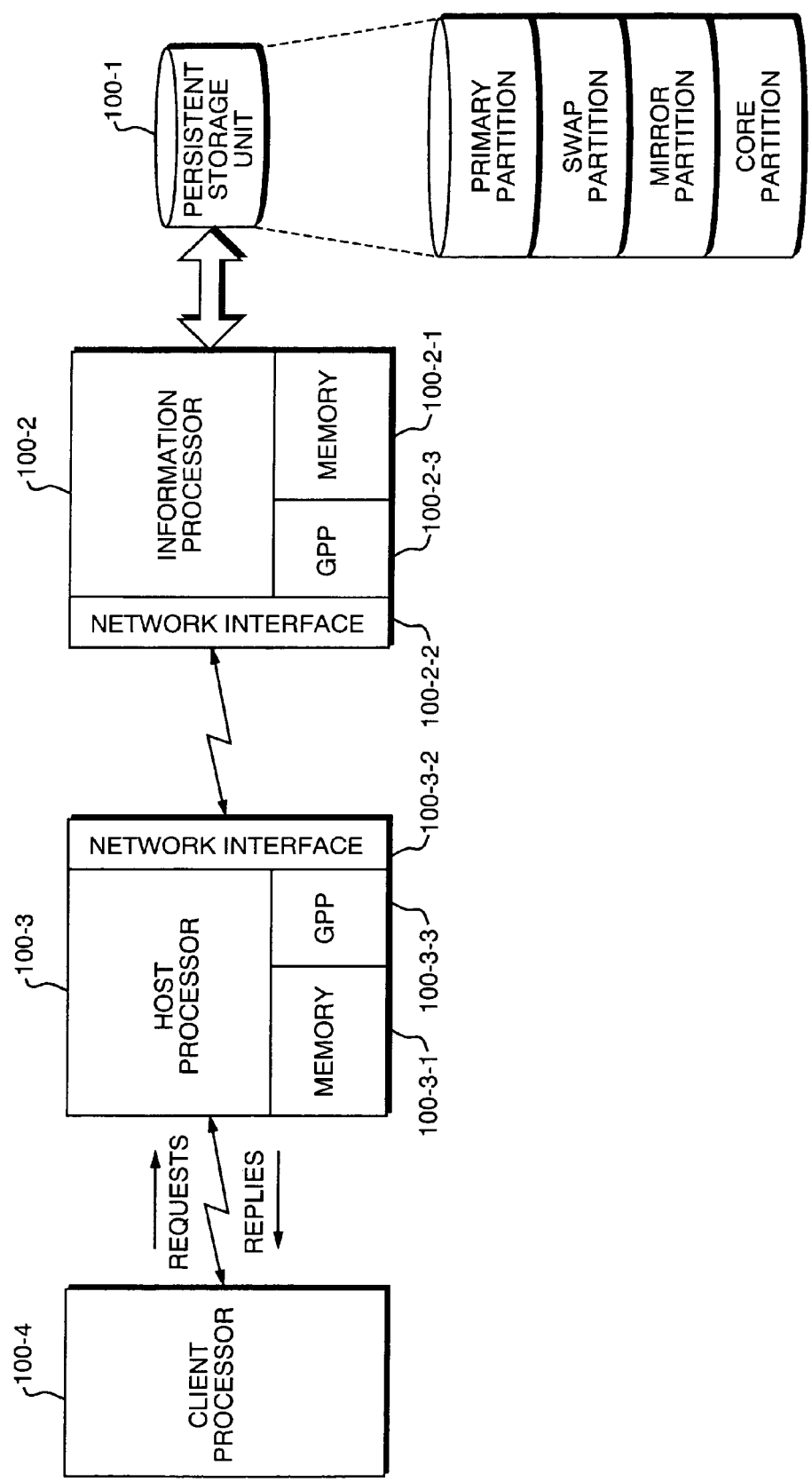
FIG. 1 is a block diagram of the hardware components relevant to the preferred embodiment of the invention.

FIG. 1 shows the relevant hardware components of the preferred embodiment of the invention. A Persistent Storage Unit 100-1 is used to hold information. An Information Processor 100-2 stores and retrieves information from a Persistent Storage Unit 100-1, at the direction of a Host Processor 100-3. A Host Processor 100-3 receives requests from, and replies to, a Client Processor 100-4. An Information Processor 100-2 further comprises a Memory 100-2-1, a Network Interface 100-2-2, and a General Purpose Processor 100-2-3. A Host Processor 100-3 also consists of a Memory 100-3-1, a Network Interface 100-3-2, and a General Purpose Processor 100-3-3.

In one mode of operation, the space within a Persistent Storage Unit 100-1 is divided into several partitions, including a primary partition for storing user information, a mirror partition for storing a backup copy of the primary information from other Persistent Storage Units 100-1, a temporary partition for holding intermediate results at the direction of an Information Processor 100-2, and a core partition for holding information about the layout information within the Persistent Storage Unit 100-1. In one mode of operation, the size of the primary partition is approximately 15 gigabytes, but other sizes could work as well.

Figure 2:
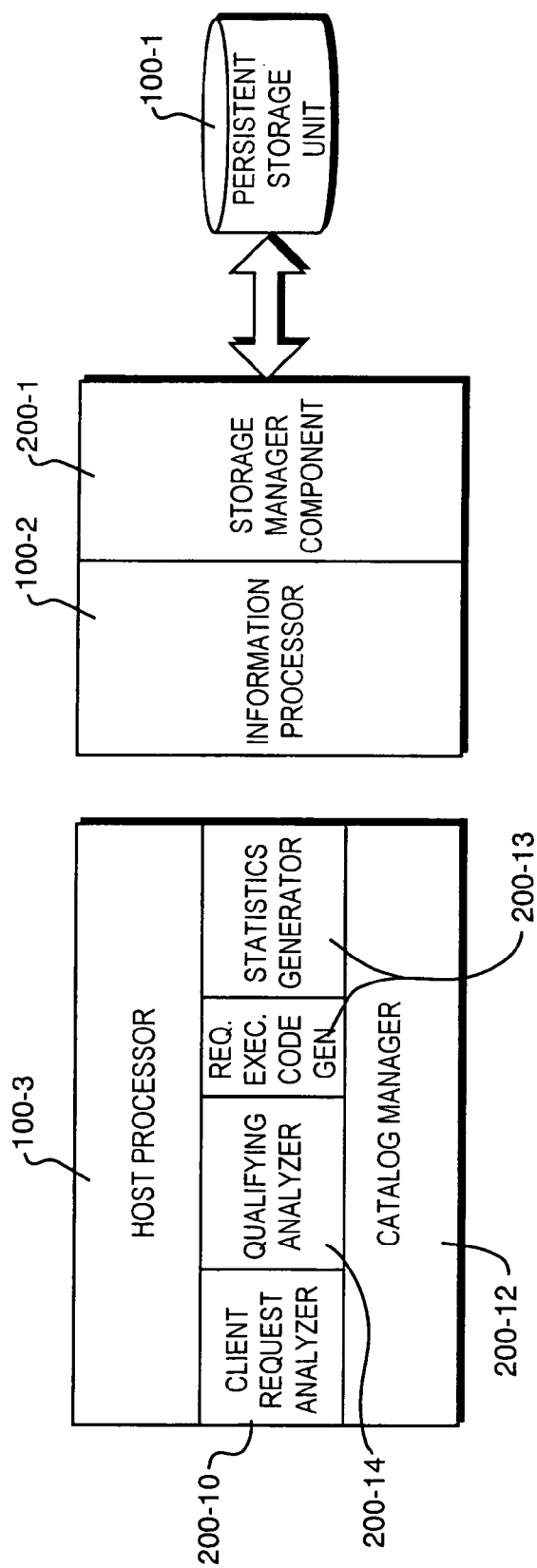
FIG. 2 is a block diagram of the software components relevant to the preferred embodiment of the invention.

FIG. 2 shows the relevant software components of the preferred embodiment of the invention. Running on an Information Processor 100-2 is a Storage Manager 200-1. Running on a Host Processor 100-3 are a Client Request Analyzer 200-10, a Request Execution Code Generator 200-11, a Catalog Manager 200-12, a Statistics Generator 200-13, and a Qualification Analyzer 200-14.

Figure 3:
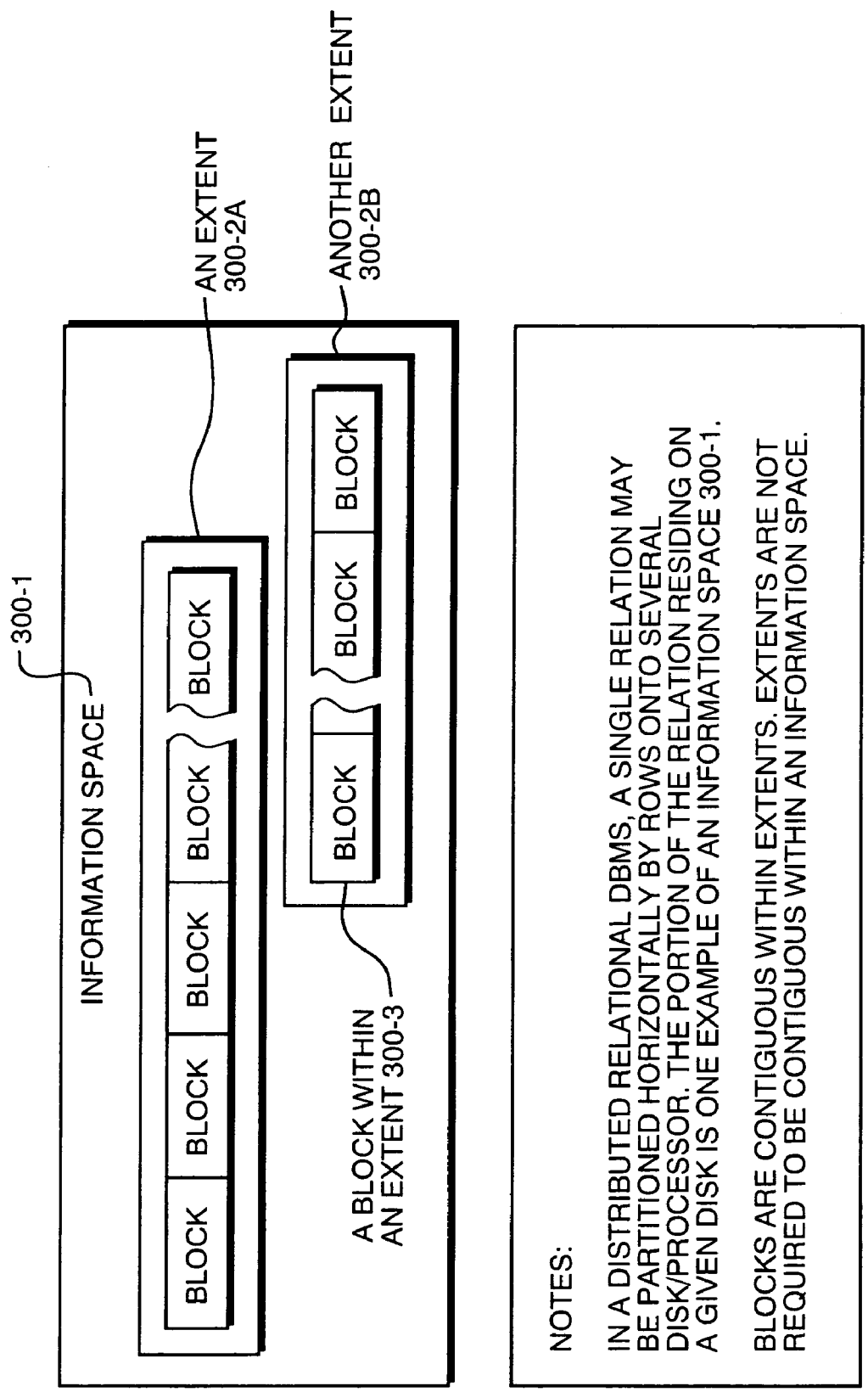
FIG. 3 is a block diagram of the organization of physical storage.

FIG. 3 illustrates the division of a large information space into smaller segments. The entire space 300-1 is divided into a large number of smaller, fixed-size extents 300-2. Each extent is further subdivided into a number of contiguous fixed size sub-extent blocks 300-3. It is possible for an extent 300-2 or a block 300-3 to be variably sized instead of fixed size, without materially impacting the preferred embodiment of the invention. In an alternative embodiment of the invention, the block sizes may be variable and may be dynamically modified based on, for example, the type of attribute the annotations relate to. For example, if the minimum and maximum values refer to time stamp data, a size of the extent may be varied so that all data for a particular time period is stored in one data block.

The main advantage of using fixed sizes is that certain computations become faster and less complex, for example, the mapping of block numbers to disk addresses. In an alternative embodiment of the invention, the fixed size may also be changed dynamically, based on the size or other characteristics of the overall database.

An extent 300-2 is a convenient unit of persistent storage allocation, so that as an information space 300-1 grows, its growth is quantized into units of extents 300-2. While the address space within an extent 300-2 is contiguous, with no holes, an information space 300-1 consists of possibly discontiguous extents 300-2. In particular, there is no requirement that a later allocation of an extent 300-2 should produce an address range that bears any fixed relationship to the address range of any earlier allocation.

A block 300-3 is the smallest unit of transfer between the Persistent Storage Unit 100-1 holding the entire space 300-1 and an Information Processor 100-2 capable of examining and manipulating the information. In one embodiment, a block 300-3 is 128K bytes, but other sizes could work as well.

In one embodiment, an extent 300-2 consists of 24 blocks 300-3 so that an extent 300-2 is 3 megabytes in size, but other sizes and numbers of blocks 300-3 could work as well. The blocks within an extent are numbered sequentially in increasing address order. New information is placed into an extent 300-2 in increasing block number order, specifically at the end of the highest numbered block 300-3 that is in use.

Figure 4:
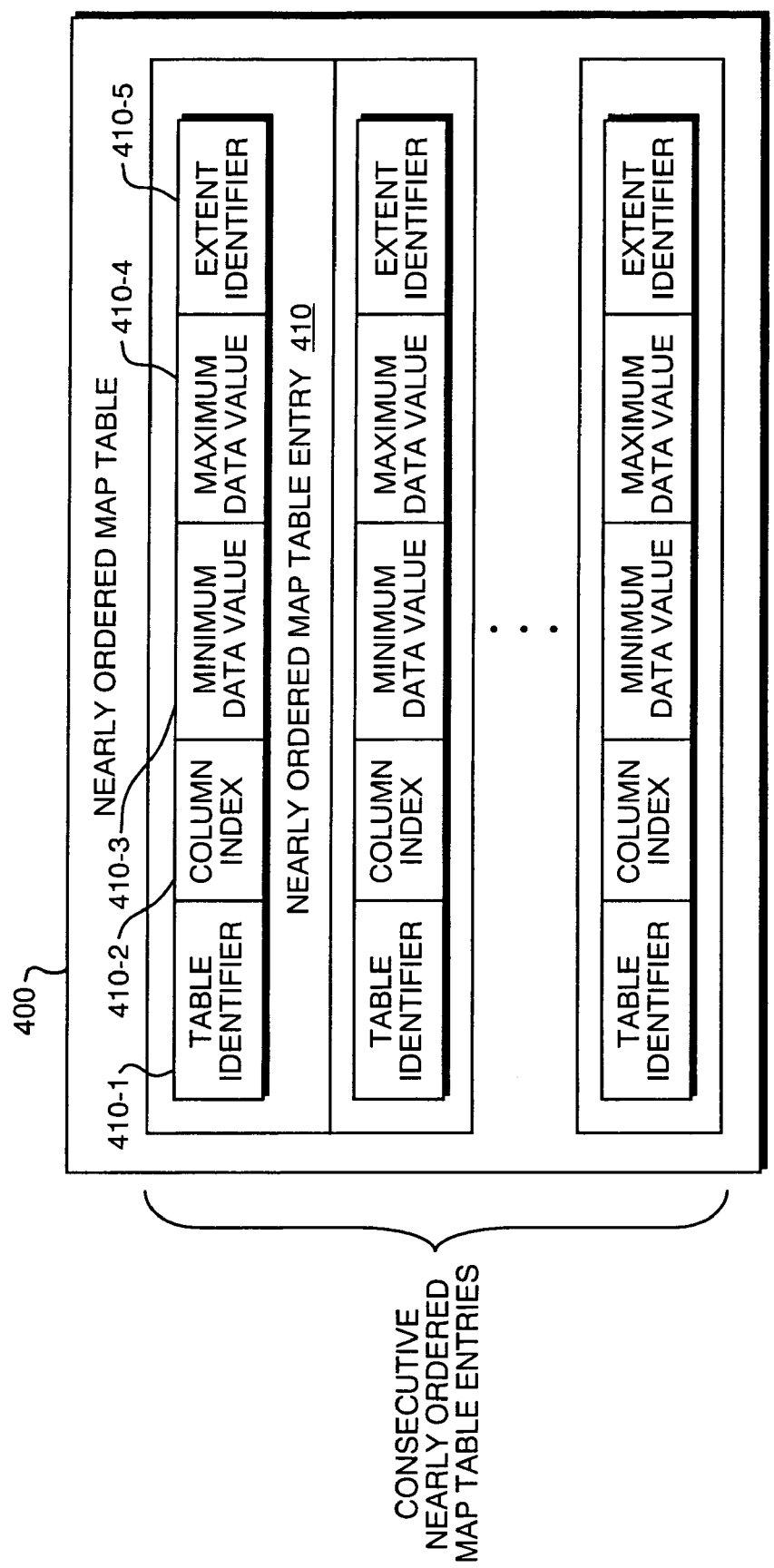
FIG. 4 is a block diagram of the data structure used for the Nearly Ordered Map Table and Entries.

FIG. 4 shows the structure of a nearly ordered map table 400, consisting of consecutive nearly ordered map table entries 410. Each nearly ordered map table entry 410 consists of a table identifier 410-1, a column index 410-2, a minimum data value 410-3, a maximum data value 410-4, and an extent identifier 410-5.

The table identifier 410-1 uniquely designates an information space 300-1. In one embodiment, it is a 4-byte numeric value, which uniquely identifies a relational table.

The column index 410-2 uniquely identifies a particular class of information within the information space 300-1 identified by the table identifier 410-1. In one embodiment, a column index 410-2 is a 2-byte numeric value that denotes a column in the relational table identified by the table identifier 410-1. In one embodiment, the column index value corresponds to the order in which columns are defined within the relational table, so that a value of 0 denotes the first column defined in the table.

In one embodiment of the invention, the minimum 410-1-3 and the maximum 410-1-4 data values are 8-byte quantities that can hold different types of data values, including dates, times, date-times, or integer values. The actual types of data held by the minimum 410-1-3 and the maximum 410-1-4 data values are specified in the definition of the column that is denoted by the column index 410-2.

In one embodiment of the invention, the extent identifier 410-5 is a 2-byte numeric value, which designates a particular extent within the information space 300-1 designated by the table identifier 410-1. Larger storage partitions would use either 4-byte extent identifiers or larger extents 300-2. Thus, in this embodiment of the invention, each nearly ordered map table entry 410 comprises 24 bytes.

In one embodiment of the invention, the nearly ordered map table entries 410 are grouped by column index 410-2, so that all the entries for the $n^{th}$ column of a table are grouped together in a single block 300-3. Note that when the total amount of storage available for information is approximately 15 gigabytes, the maximum number of extents for this storage is approximately 5154. When the size of a nearly ordered map table entry 410 is 24 bytes, it is possible to pack the nearly ordered map table entries 410 for each of the possible 5154 extents into a single 128K block 300-3. Since a block is the unit of transfer between the Persistent Storage Unit 100-1 and the Information Processor 100-2, it is possible to access the entire nearly ordered map for a given column in a single transfer from the Persistent Storage Unit 100-1.

As an optimization, it is possible to pack the nearly ordered map table entries 410 for the same column index of all tables into a single block 300-3.

Figure 5:
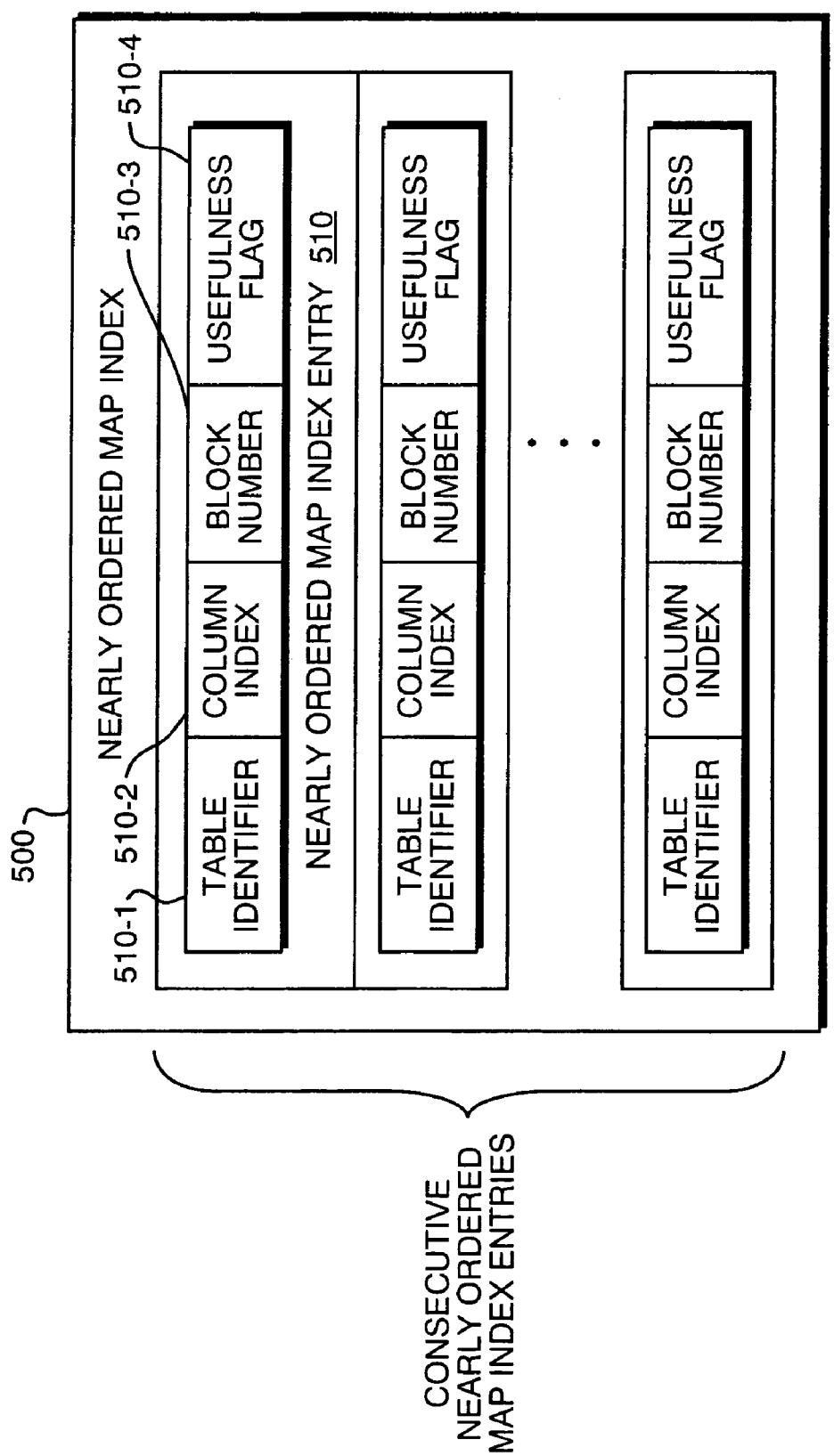
FIG. 5 is a block diagram of the data structure used to index Nearly Ordered Map Entries.

FIG. 5 shows the structure of a nearly ordered map index 500, consisting of consecutive nearly ordered map index entries 510. Each nearly ordered map index entry 510 consists of a table identifier 510-1, a column index 510-2, and a block number 510-3. The table identifier 510-1 should have the same function and interpretation as the table identifier 410-1 in the nearly ordered map table entries. In one embodiment, it is a 4-byte numeric value, which uniquely identifies a relational table. The column index 510-2 should have the same function and interpretation as the column index 410-2 in the nearly ordered map table entries. In one embodiment, it is a 2-byte numeric value. The block number 510-3 denotes the block 300-3 that contains the nearly ordered map table entries 410 for the table column designated by the table identifier 510-1 and the column index 510-2. In one embodiment it must be at least a 2-byte numeric value.

When a large information space 300-1 is divided into a set of extents 300-2, a nearly ordered map table 400 can be consulted to determine the subset of extents 300-2 that could possibly hold values of interest. Extents 300-2 that cannot possibly hold values of interest need not be scanned. Conceptually, the central algorithm of the preferred embodiment of the invention takes a description of information to retrieve and returns a list of extents that might hold that information. In practice, this work is divided into several algorithms that run within different hardware and software components.

Figure 6:
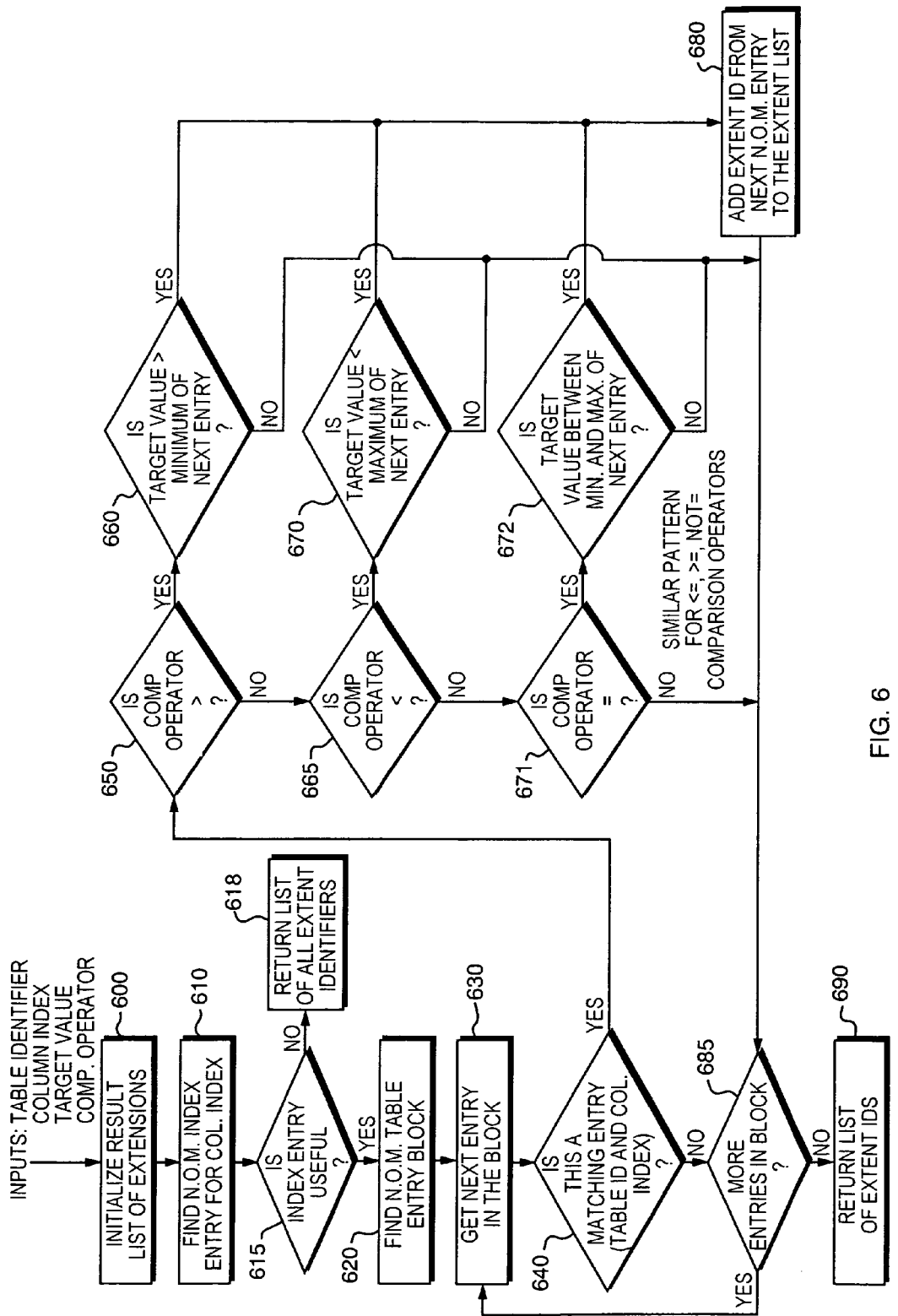
FIG. 6 is a flow chart of a procedure for computing an extent list from a simple expression.

FIG. 6 shows a flow chart of a procedure for computing the extent identifier list for simple nearly ordered map expressions. A simple nearly ordered map expression is one that compares a value in a particular column to a literal constant. Six allowable comparisons include greater-than, less-than, greater-than-or-equal-to, less-than-or-equal-to, equal-to or not-equal to. The four inputs to the procedure are (1) a table identifier that is used to denote the target information space 300-1, (2) a column index that is used to denote a class of information space specified by the table identifier, (3) a target value of a type compatible with the class of information associated with the column index, and (4) a comparison operator, such as greater-than or less-than, with which to compare the target value to and the minimum or maximum value of the denoted class of information within the associated extents. The procedure runs within the Storage Manager 200-1 component on the Information Processor 100-2.

In step 600, local variables are initialized, including a result list of extent identifiers. In step 610, the Storage Manager 200-1 finds the nearly ordered map index entry 510 whose column index 510-2 matches the column index that is passed into the procedure. In step 615, if the index entry 510 found in step 610 is not useful (it's usefulness flag 510-4 is false), then the process returns a list of all extent identifiers in step 618. Otherwise, in step 620, the Storage Manager 200-1 finds the block 300-3 of the nearly ordered map table 400 that is indicated by the block number 510-3 in the nearly ordered map index entry 510 found in step 610. In one embodiment, this block 300-3 will be cached in memory 100-2-1 after the first time it is read from a Persistent Storage Unit 100-1.

Step 630 loops over each nearly ordered map table entry 410 in the block 300-3 retrieved in step 620. The condition in step 640 tests whether both (a) the table identifier 410-1 in the next nearly ordered map table entry 410 is equal to the table identifier passed into the procedure, and (b) the column index 410-2 in the next nearly ordered map table entry 410 is equal to the column index passed into the procedure. If both of these conditions are true, then step 650 tests whether the comparison operator passed into the procedure is a greater-than operator, and if so, step 660 tests whether the target value passed into the procedure is greater than the minimum data value 410-3 associated with the next nearly ordered map table entry 410. If it is, the extent identifier 410-5 in the next nearly ordered map table entry 410 is added to a result list of extent identifiers in step 680. If the comparison operator is instead a less-than operator, then step 670 tests whether the target value passed into the procedure is less than the maximum data value 410-4 associated with the next nearly ordered map table entry 410. If it is, the extent identifier 410-5 in the next nearly ordered map table entry 410 is added to a result list of extents in step 680.

Similar processing occurs for comparison operators like '>=', '<='. For processing the equals comparison operator, the extent 300-2 is included if the target constant lies within the range of minimum and maximum. For processing the not-equals comparison operator, the extent 300-2 is eliminated from consideration if and only if its minimum and maximum values are equal to the target constant. After all the nearly ordered map table entries 410 in the block 300-3 retrieved in step 620 have been examined, the result list of extent identifiers is returned as the result of the procedure in step 690.

The procedure described above is useful for the simple situations in which the information requested can be described as a simple comparison of a single column value with a constant value. But most requests for information have more complex conditions. Some of these can be described as a Boolean combination of the simple comparisons described above. For example, a request to compare year over year results might retrieve events that occurred either during January of this year or during January of last year. This can be expressed as a Boolean combination:

((date-column-value>='Jan. 01, 2003') AND (date-column-value<'Feb. 01, 2003')) OR ((date-column-value>='Jan. 01, 2002') AND (date-column-value<'Feb. 01, 2002'))

Figure 7:
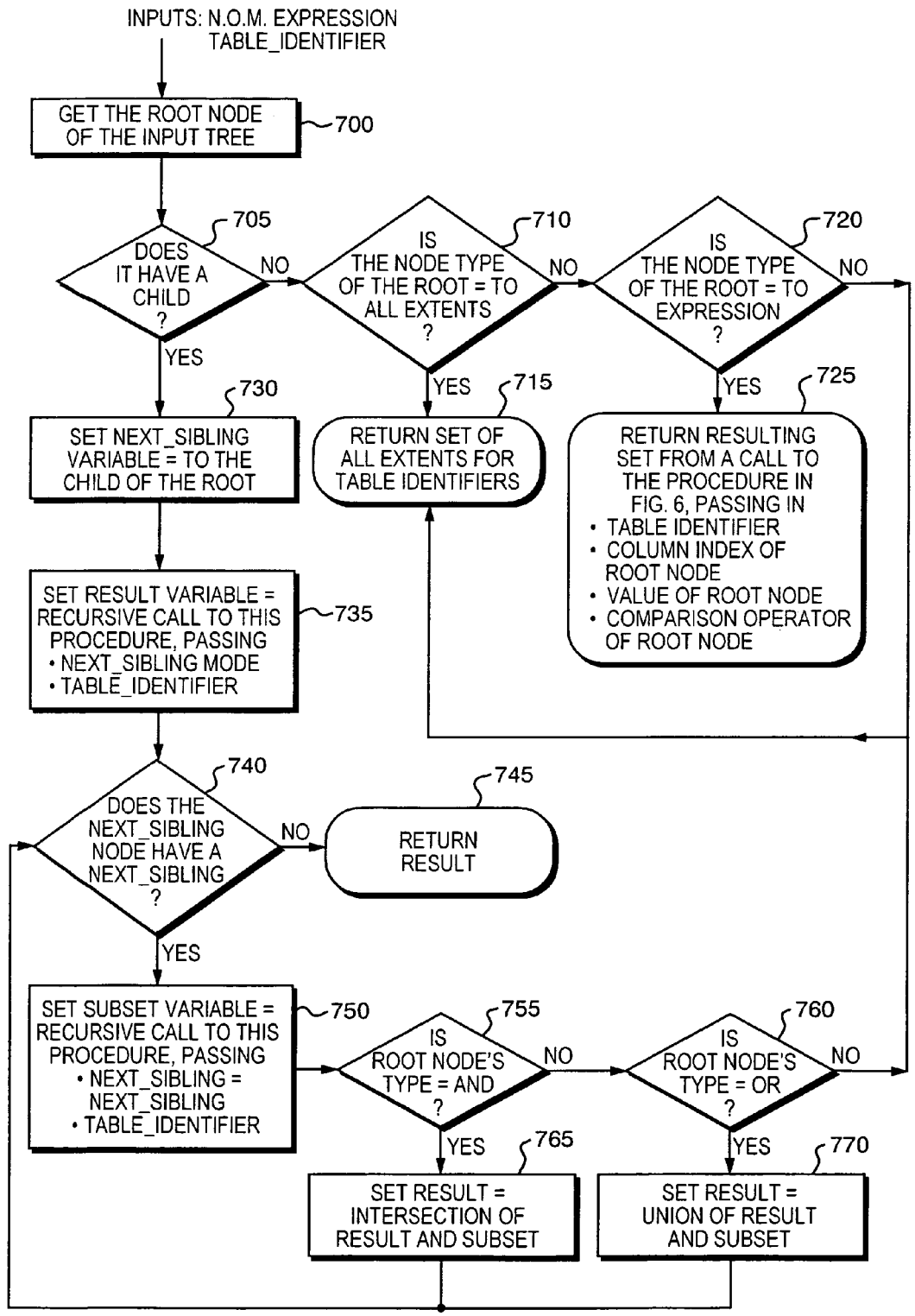
FIG. 7 is a flow chart of a procedure for computing an extent list from a Boolean combination of simple expressions.

FIG. 7 shows a flow chart of a procedure for returning a list of extent 300-2 identifiers that could contain records that satisfy a Boolean combination of simple comparisons. The basic idea of the procedure is to compute the list of extent identifiers for each of the comparisons in the Boolean combination, and then to form the intersection of the resulting lists for each Boolean conjunction and to form the union of the resulting lists for each Boolean disjunction. The resulting list will include identifiers of only those extents that could contain values that satisfy the Boolean combination as a whole.

The procedure accepts a nearly ordered map expression tree 1000 as input and produces a set of extent identifiers as output. The procedure operates recursively in a depth first fashion. When it encounters a leaf node containing a simple nearly ordered map expression 1000-3, it passes the contents of the expression to the procedure described in FIG. 6 for computing the extent id set for simple nearly ordered map expressions. Some leaf nodes 1000-2 contain an indication that they are equivalent to all extent identifiers. This could be the case if the retrieval request used an expression that was too complex for a nearly ordered map to handle, for example, comparing one column value to another column value. When the procedure encounters such a node, it returns the set of all extent identifiers. When the procedure encounters a non-leaf node 1000-1, it recursively calls itself on each of the non-leaf node's children, to compute their sets of extent identifiers. Then it combines these sets of extent identifiers according to the Boolean operator specified in the non-leaf node. If the operator is a conjunction (AND) then the procedure forms a new set of extent identifiers that is the intersection of the sets of extent identifiers returned for each of the node's children. If the operator is a disjunction (OR) then the procedure forms a new set of extent identifiers that is the union of the sets of extent identifiers returned for each of the node's children.

The nearly ordered map expression tree used as input to the procedure described above is generated on the Host Processor 100-3 by the Qualification Analyzer 200-14. When the Client Request Analyzer 200-10 receives a request to retrieve information, it analyzes the specification of the information to retrieve. In one embodiment, the Postgres query analyzer is used to generate an expression tree that corresponds to the 'where' clause of a SQL query. Some of the restrictions specified in the information request may be too complex for a nearly ordered map to handle. The Qualification Analyzer 200-14 transforms the expression tree produced by the Client Request Analyzer 200-10 into the nearly ordered map expression tree 1000 form used above. This data is then sent along with the information request from a Host Processor 100-3 to one or more Information Processors 100-2, which use the nearly ordered map expression tree 1000 as described in the procedure above to limit the scope of a search for information. In one embodiment, the Qualification Analyzer 200-10 performs certain optimizations in this transformation process. If a node is a disjunction (OR), and if any of its children are an 'all-extents' indicator, then it's possible to replace the disjunction with the all-extents indicator and to prune the children. If a node is a conjunction (AND), and if all of its children have the 'all-extents' indicator then it's possible to replace the conjunction with the all-extents indicator and to prune the children. If a node is a conjunction (AND), and if some of its children have the 'all-extents' indicator while others of its children are expressions, then it is possible to prune the children that have the 'all-extents' indicator while leaving the other children intact.

As information stored within an extent 300-2 changes, the minimum 410-3 and maximum 410-4 value annotations in the nearly ordered map table entry 410 associated with that extent 300-2 may also need to change. In one mode of operation, these changes, if necessary, can occur concurrently with the change to the underlying information, on an 'incremental' basis. In another preferred mode of operation, changes to the nearly ordered map table can be performed subsequent to changing the underlying information, on a 'batch' basis.

The batch mode approach to nearly ordered map updates is accomplished in two phases. First, statistics are generated for each extent 300-2 of an information space 300-1. Then, an assessment is made as to whether the size and distribution of information within the information space 300-1 is such that requests for this information would benefit from using a nearly ordered map.

Figure 8:
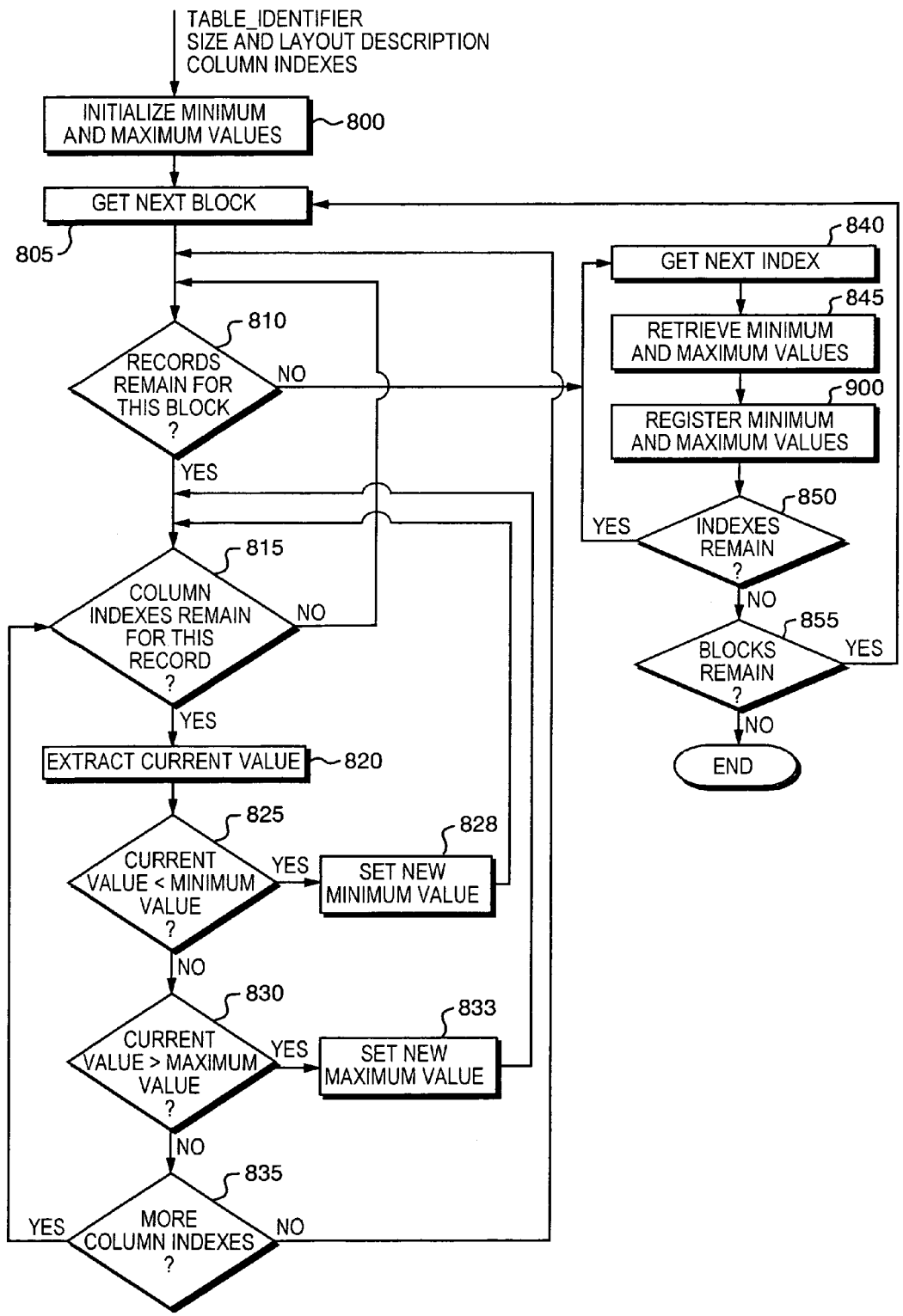
FIG. 8 is a flow chart of a procedure to update nearly ordered map entries.

FIG. 8 shows a flow chart of a procedure used to update nearly ordered maps. The inputs to the procedure include (1) a table identifier that designates a particular information space 300-1, (2) a description of the size and layout of a record within the information space 300-1, and (3) a list of column indexes that may be candidates for nearly ordered maps. In one embodiment, any column whose data type is a date, a time, a date-time, or an integer value is a candidate for a nearly ordered map, however it is reasonable to allow nearly ordered maps for other data types as well. The effect of the procedure is to create or update nearly ordered map table entries 410 for the extents 300-2 of the information space 300-1 designated by the table identifier input. The output of the procedure is not essential to the operation of the preferred embodiment of the invention.

The procedure starts in step 800 by allocating and initializing storage to hold a minimum and maximum value for each column in the input list of column indexes. Next, it loops over each block 300-3 associated with the table identifier input, reading in the next such block 300-3 from the Persistent Storage Unit 100-1 in step 805. The procedure loops over each record stored in the block 300-3, locating the next such record in step 810. For fixed size records, the method used in step 810 to locate the next record is simply to increment a record pointer by the fixed size of a record. For variable size records, the method used in step 810 to locate the next record involves finding a field in the current record that specifies the size of the current record, and then incrementing a record pointer by that size. The procedure then loops over each column index in the input list of column indexes, getting the next such column index in step 815. In step 820, the procedure extracts the current value of the field of the next record that is located at the next column index.

In step 825, the procedure tests whether the current value extracted in step 820 is less than the minimum value for the next column that was allocated and initialized in step 800. If so, step 828 sets the minimum value for the next column equal to the current value extracted in step 820. Otherwise, in step 830, the procedure tests whether the current value extracted in step 820 is greater than the maximum value for the next column that was allocated and initialized in step 800. If so, step 833 sets the maximum value for the next column equal to the current value extracted in step 820. In comparison 835, if there are more column indexes in the input list of column indexes, the procedure loops back to step 815. Otherwise in comparison 838, if there are more records within the next block, the procedure loops back to step 810. Otherwise, the procedure has completed gathering the minimum and maximum values for all columns of interest within a block 300-3. In step 840, the procedure loops over the storage allocated in step 800 to hold the minimum and maximum values associated with each column index in the input list of column indexes, retrieving the pair of minimum and maximum values associated with the next column index.

Figure 9:
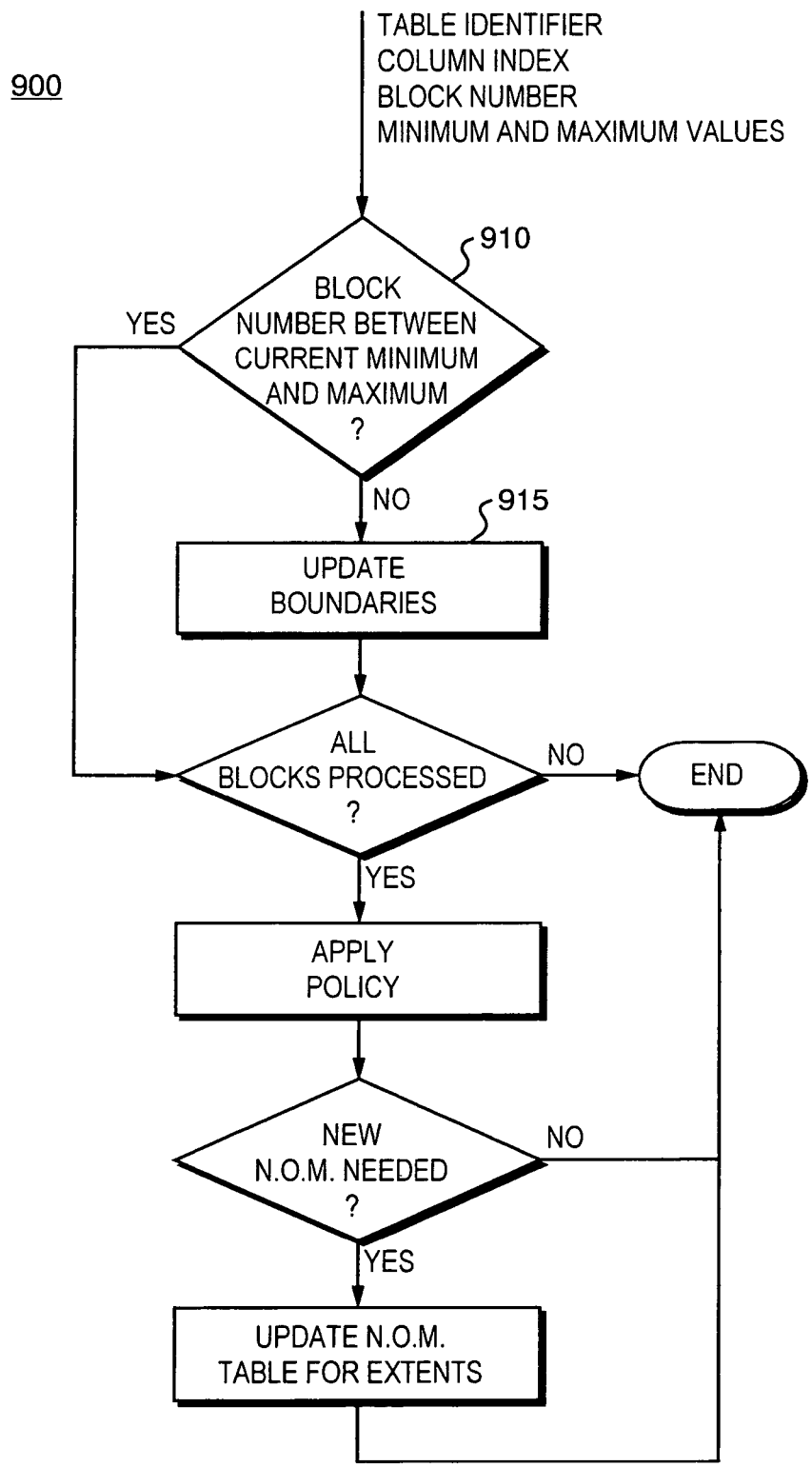
FIG. 9 is a flow chart of a procedure to register the minimum and maximum values for a given column index of a given block number of a given table identifier.
Figure 10A:
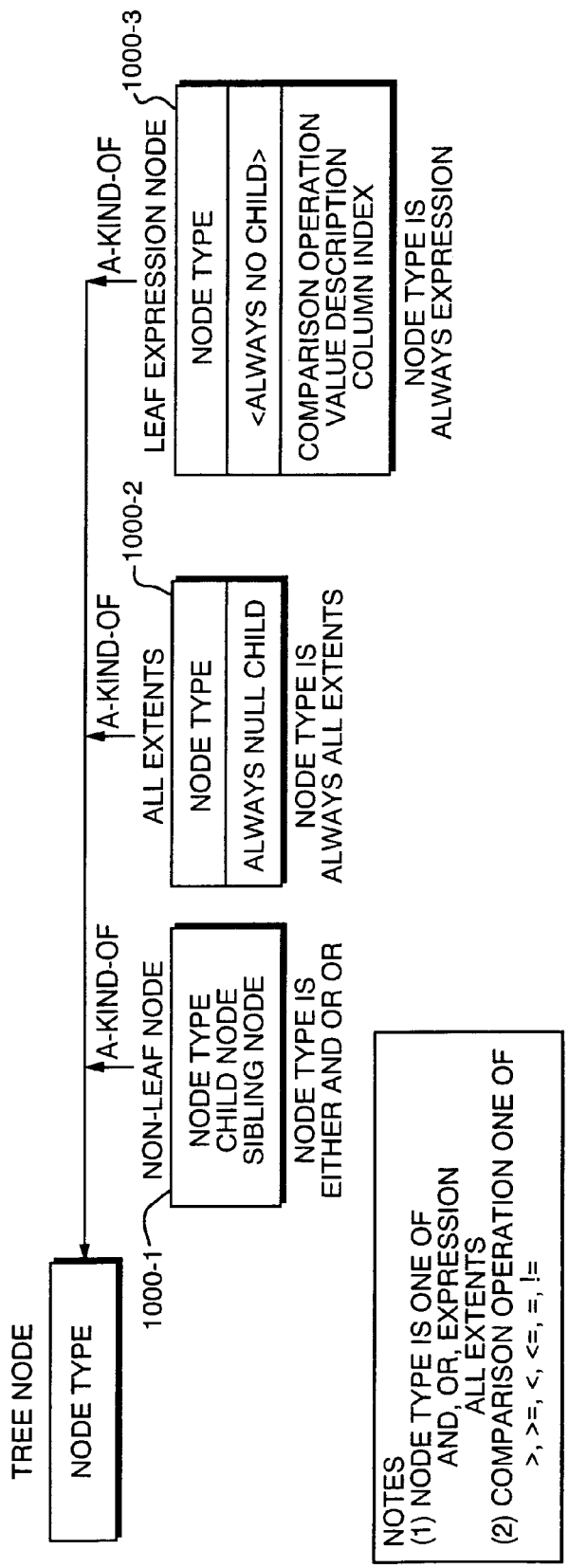
FIGS. 10A and 10B represent a block diagram of the tree structure used to represent search expressions.
Figure 10B:
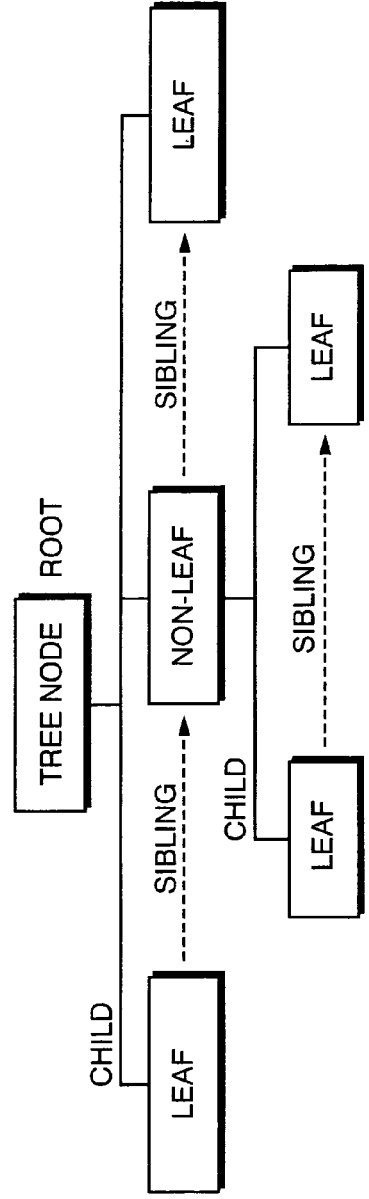

For each such pair of values in step 845, the procedure calls a subroutine described in FIG. 9, to register the minimum and maximum values for a given column index of a given block number of a given table identifier. If in step 850, there are more column indexes to process, the procedure loops back to step 840. Otherwise, if there are more blocks to be read in step 855, the procedure loops back to step 805. Otherwise, the procedure has finished and exits.

In one embodiment of the invention, the code to implement the procedure described above in FIG. 8 is generated on the Host Processor 100-3 by a Request Execution Code Generator 200-11. When a database administrator or utility requests that new nearly ordered map statistics be gathered for an identified table, a Statistics Generator 200-13 consults a Catalog Manager 200-12 to determine which column indexes of the identified table are candidates for a nearly ordered map. This determination is based on the data type of the column. In one embodiment, columns whose data type is a date, a time, a date-time, or an integer are candidates for a nearly ordered map. The Statistics Generator 200-13 then calls the Request Execution Code Generator 200-11 to generate the code that implements the procedure described above in FIG. 7, but with certain modifications to the procedure described in FIG. 7.

Since the number of columns that are candidates for nearly ordered map generation are known at code generation time, the allocation and initialization of storage in step 700 can be replaced with the declaration and initialization of stack based variables to hold the minimum and maximum values for each column of interest for each block 300-3. Furthermore, since the number of candidate columns is known at code generation time, the loops over columns starting in steps 715 and 740 can be flattened, and consist of code which processes the fixed known set of column indexes.

FIG. 9 is a flow chart of a procedure for generating new nearly ordered map entries. The procedure takes as input (1) a table identifier, (2) a column index, (3) a block number, (4) a minimum value, and (5) a maximum value. The table identifier designates an information space 100-1 and in one embodiment, a relational database table. The column index designates a class of information within the information space 100-1 and in one embodiment, a column within a relational database table. The block number designates a block 300-3 within the information space 100-1, and in one embodiment, a particular set of 128K bytes containing records within a relational database table.

The minimum and maximum values are data values of the data type associated with the class of information designated by the column index, and are 8-byte quantities in one embodiment. The effect of the procedure is to potentially create or update nearly ordered map table entries 410 and nearly ordered map index entries 510. The outputs of the procedure if any are not relevant to the preferred embodiment of the invention.

The procedure performs some special processing for the first and last block numbers of an extent 300-2, and for the last block number of a table. For the first block number of an extent 300-2, the procedure initializes running minimum and maximum values for each candidate column of the extent 300-2. For block numbers between the first and the last block number of an extent 300-2, the procedure updates the running minimum and maximum values to include the input minimum and maximum value. For the last block number of an extent 300-2, the procedure makes a temporary record of the minimum and maximum values of all candidate columns for the extent 300-2.

After processing the last block number of a table, the procedure applies a policy to determine whether the amount of data and the distribution of values stored in the temporary records, justifies a nearly ordered map for the candidate columns of the table. For each candidate column that should have a nearly ordered map under the policy, the procedure updates nearly ordered map table entries for each extent associated with the candidate column to contain the minimum and maximum values for that column and extent as computed by the procedure above.

In one embodiment of the invention, the policy is to always provide a nearly ordered map for every candidate column. In this way, a table whose nearly ordered map improved over time, via better ordering of new records, could be well handled. In a related embodiment, the nearly ordered map index entry 510 could be expanded to hold a usefulness flag. If the distribution of values for a given column of a given table was too widely distributed across extents 300-2 to provide a useful nearly ordered map, then the index entry 510 for the given table identifier 510-1 and column index 510-2 could have its usefulness flag set to false. If the distribution of values improved over time, a policy could dictate the point at which the usefulness flag was set to true, so that the nearly ordered map would be used for subsequent requests for information based on that column.

In another embodiment of the invention, a policy is used to determine whether a table is large enough to justify nearly ordered maps for its columns. Tables that are small enough to be stored in a single extent would not benefit from a nearly ordered map as long as some data is returned from a request for information. The time required to use a nearly ordered map for such cases would wasted, and would increase the total time required to satisfy the request. In contrast, queries against tables that are very large stand to gain the most benefit from the use of nearly ordered maps.

If the focus is on improving response time of all queries, then it could make sense to use nearly ordered maps for tables larger than an extent in size, so long as the distribution of column values provided good specificity. However, if the focus is on improving the total throughput of all queries, then it's probably the case that 90% or more of the time saved by the use of nearly ordered maps occurs from the use of nearly ordered maps for queries against the very largest tables. In this latter case, a policy could choose to define nearly ordered maps only for tables that take up more than 2% of the available storage, or more than 300 megabytes when 15 gigabyte of storage is available. These numbers and percentages are not essential to the operation of the preferred embodiment of the invention and other policies could work as well.

In yet another embodiment of the invention, a policy is used to determine whether the distribution of column values across extents 300-2 justifies the use of a nearly ordered map. If each extent 300-2 of an information space 300-1 had precisely the same minimum and maximum values for a given column index, then there would be no benefit to the use of a nearly ordered map so long as any data satisfied the request. In this case, there is 100% overlap of the value ranges over 100% of the extents 300-2. The less overlap there is among value ranges across extents 300-2, the greater the benefit of the use of nearly ordered maps.

To assess the distribution of column values in this embodiment, the procedure looks at the range of column values across the extents 300-2 of an information space 300-1. If the ranges of two extents 300-2 overlap by more than 50%, the procedure puts them together in a single logical 'bucket'. If the ranges of two extents 300-2 overlap by less than 50%, the procedure places them in different logical 'buckets'.

After placing all extent ranges into logical 'buckets', if all extents 300-2 are in one logical 'bucket', the policy is to avoid defining a nearly ordered map for that column. If the number of logical 'buckets' is at least 50% of the number of extents 300-2, the policy is to define a nearly ordered map. If any one logical 'bucket' holds more than 50% of the data in the information space 300-1, the policy avoids define a nearly ordered map, otherwise the policy is to define a nearly ordered map. These percentages are not essential to the operation of the preferred embodiment of the invention, and other policies could work as well.

In the interval between batch updates to nearly ordered maps, the creation, deletion and modification of information can affect the validity of the nearly ordered maps. The preferred embodiment of the invention takes a conservative and pessimistic approach to such situations, as described in the sections below.

When a record is deleted from an information space 100-1 denoted by a table identifier, if that record contained a column value that was the minimum value for all columns in the record's extent 300-2, then the new minimum value for that column in that extent 300-2 may actually be greater than the recorded minimum value 410-3 in the nearly ordered map table entry 410 for that column, table identifier and extent 300-2. Similarly, if that record contained a column value that was the maximum value for all columns in the record's extent 300-2, then the new maximum value for with that column in that extent 300-2 may actually be less than the recorded maximum value 410-4 in the nearly ordered map table entry 410 for that column, table identifier and extent 300-2. In other words, deleting a record can have the effect of narrowing the range of values for columns within an extent 300-2.

If the nearly ordered map entry 410 for that extent 300-2 were updated to reflect such new minimum or maximum values, it could help improve performance of subsequent requests, which might be able to avoid scanning the more narrowly defined extent 300-2. However, in the batch mode of operation, record deletions have no affect on nearly ordered map table entries 410. If the range of the extent 300-2 was narrowed by modifying the corresponding nearly ordered map table entry 410, then there might be concurrency control problems if the deletion was part of a transaction that aborted. Furthermore, if the information space 100-1 supports multi-versioning, then certain transactions or applications operating in an older version time might need to have visibility to the deleted records, and could miss seeing these records if the nearly ordered map table entry 410 was not also versioned.

A more liberal and optimistic treatment of deleted records is possible. If both the nearly ordered map table and the nearly ordered map index information are versioned along with the information spaces they describe; and if both the nearly ordered map table and the nearly ordered map index information are updated using the same transaction mechanism and as part of the same transaction as that which deletes a record, then correctness may reasonably be assumed. The cost of this increase in potential accuracy of the nearly ordered map is added processing during every record deletion. If the nearly ordered map is already specific and helpful, then the benefit of making it even more specific and helpful may not justify the added computational cost for every record deletion.

When a new record is created, if that new record contained a column value that was the minimum value for all columns in the record's extent 300-2, then the new minimum value 410-3 of the nearly ordered map table entry 410 associated with that column for that extent 300-2 should be lowered at least to the value specified in the new record. Similarly, if that new record contained a column value that was the maximum value for all columns in the record's extent 300-2, then the new maximum value 410-4 of the nearly ordered map table entry 410 associated with that column for that extent 300-2 should be raised at least to the value specified in the new record. In other words, creating a record can have the effect of expanding the range of values for columns within an extent 300-2.

If the nearly ordered map entries 410 for the new record's extent 300-2 were not updated to reflect such new minimum or maximum values, then information requests might erroneously skip over the new records. In one embodiment, nearly ordered map table entries 410 for extents 300-2 containing newly created records are maximally expanded to encompass all possible values for the column's data type. This is more conservative and pessimistic than would be the case of expanding the range of an extent's 300-2 nearly ordered map table entry 410 to encompass only the new minimum and maximum values specified in the new record.

If the Storage Manager 200-1 allocates a new extent 300-2 to hold a newly created record, then it also creates new nearly ordered map table entries 410 for each column upon which a nearly ordered map is to be defined. In one embodiment, the minimum 410-3 and maximum 410-4 values associated with these nearly ordered map table entries 410 have the widest possible range. If the newly created record is the first record associated with the information space 100-1 (or relational database table in one embodiment), then the Storage Manager 200-1 also creates a nearly ordered map index entry 510 for each new nearly ordered map table entry 410. It initializes these index entries 510 with the block number that contains the new nearly ordered map table entries 410.

As an optimization, when the nearly ordered map table entries 410 for a given column number across all tables are placed into the same block 300-3, then a nearly ordered map index entry 510 is created for a given column index only if there is no other nearly ordered map index entry 510 already defined for that index, independent of the table identifier.

A more liberal and optimistic treatment of newly created records is possible. If both the nearly ordered map table and the nearly ordered map index information are versioned along with the information spaces they describe; and if both the nearly ordered map table and the nearly ordered map index information are updated using the same transaction mechanism and as part of the same transaction as that which creates a new record, then correctness may reasonably be assumed. The cost of this increase in potential accuracy of the nearly ordered map is added processing during every record creation. In environments where hundreds of millions of new records are created in a batch loading process, the computational cost of incrementally adjusting minimum 410-3 and maximum 410-4 values of nearly ordered map table entries 410 may be unacceptable. In such batch loading cases, a batch statistics generation, as described above and in FIG. 7, may be more cost effective computationally.

In another embodiment, the actual values in newly created records are used to update the minimum 410-3 and maximum 410-4 values of the corresponding nearly ordered map table entry 410. This is done without multi-versioning the nearly ordered map data, or rolling back the changes to the nearly ordered map table entry 410 should the transaction in which the new records are created be aborted. The effect of this is that the range (difference between maximum 410-4 and minimum 410-3 values of the nearly ordered map table entry 410) will be at least as broad as it should be, and possibly broader. An overly broad range means that the extent 300-2 may be searched needlessly for requested information. This conservative position is safe, is less pessimistic than invalidating the nearly ordered map table entries 410 for extents 300-2 that have newly created records, and doesn't require the computational complexity and storage overhead of supporting multi-versioning or rolling back changes to nearly ordered map table entries 410.

When an existing record is updated, if the information space supports multi-versioning, one embodiment pessimistically assumes that its column values have maximally expanded the range of all nearly ordered map table entries 410 associated with the extent 300-2 holding the new version of the record. If the information space does not support multi-versioning, one embodiment pessimistically assumes that its column values have maximally expanded the range of all nearly ordered map table entries 410 associated with the extent 300-2 containing the record.

In some modes of operation, the space used to store information within an information space 300-1 is periodically reclaimed. For example, in a data warehouse with a policy of keeping the last 120 days of event information, any event information that is older than 120 days may be archived. The extents 300-2 used to store this old information can then be reclaimed and reused for storing other information.

In one embodiment of the invention, reclamation can be accomplished freeing the blocks 300-3 in the lowest extents being reclaimed, and by renumbering the blocks 300-3 within all extents 300-2 that are kept. For example, suppose that an information space 300-1 initially consisted of 10 extents 300-2; and that after a period of time, policy dictated that the information stored within the first 3 extents 300-2 could be archived and that the space used by those first 3 extents 300-2 could be reclaimed. If an extent consists of 24 blocks 300-3, then the first block 300-3 of the original fourth extent 300-2 would have been numbered 72 (3*24).

After the reclamation, however, the first block 300-3 of the original fourth extent 300-2 should be renumbered to become the first block 300-3 of the first extent 300-2. This can be accomplished by subtracting the number of blocks 300-3 reclaimed from each of the block numbers that are kept, so that the new block number of the first block 300-3 of the original fourth extent 300-2 would become 0 (72 originally minus the number of blocks reclaimed, which is also 72 in this example).

When the blocks 300-3 of an extent 300-2 are renumbered, their mapping to extent number may be changed in a way that invalidates nearly ordered map entries. A simple procedure can be used in this case to restore the validity of the mapping.

If a number N of extents 300-2 of blocks have been reclaimed, then the nearly ordered map table entries 410 for those extents 300-2 are deleted from the nearly ordered map table 400. In addition, the same number N should be subtracted from the all extent identifiers 410-5 of all remaining nearly ordered map table entries 410 associated with the information space 300-1 that has undergone reclamation.

The use of Nearly Ordered Maps with other partially ordered relations is similar to the above. One example is their use with bucket-sorted materialized views. In this example, the sort phases are traditional: Phase 1. Create histogram & identify bucket boundaries; Phase 2. Put data into buckets; and Phase 3. Sort each bucket. While this example is an unembellished bucket sort; nearly ordered maps apply equally well with other partially ordered relations.

Typically, Phase 1 is fairly quick and may be done as data is loaded. In Phase 2, the raw data is read and the requested fields are distributed into their appropriate buckets without sorting. In Phase 3 each of the buckets are sorted.

With the preferred embodiment of this invention, Nearly Ordered Maps are created and maintained, as described in the earlier sections, during both Phase 2 and Phase 3. The Nearly Ordered Maps created after Phase 2 are particularly useful in that the partially ordered relation created after Phase 2 may be used in queries without a full table scan. For those queries that have a restrict clause or order by clause on the column index then only those portions of the disk which may contain target data are scanned. Additionally, for queries that expect perfectly sorted data (Phase 3 data) coming from the disk, this Phase 2 data may be read and a quick sort of that data which met the restrict may be made after reading from the disk.

Since Phase 1 and Phase 2 require approximately 40% of the total bucket sort time, being able to use a Phase 2 relation permits the effective "sort" time for a table to be 40% of what it would otherwise be. Phase 3 may then be performed on a bucket-by-bucket basis as a background task.

While the preferred embodiment of this invention has been particularly shown and described with references to preferred embodiments thereof, it will be understood by those skilled in the art that various changes in form and details may be made therein without departing from the scope of the preferred embodiment of the invention encompassed by the appended claims.

What is claimed is:

1. A computer-implemented method of locating desired data in a database using nearly-ordered maps, said method comprising:
   dividing data in the database into a plurality of extents;
   annotating each extent with a range of data values contained in the extent, the range of data for each extent comprising one or more ranges of data based on one or more attributes;
   selecting one or more extents which may contain the desired data by selecting one or more extents based on a preselected set of attributes for which associated ranges of data overlap at least partially with a data range for the desired data, using a preselected set of data attributes based on the one or more attributes associated with the extent; and
   searching the selected one or more extents to locate the desired data.

2. The method of claim 1 wherein the one or more attributes are logically ordered and the step of selecting one or more extents based on a preselected set of attributes further comprises:
   selecting one or more extents based on a preselected set of attributes based on ranges for those attributes in order according to given logical order of the attributes.

3. The method of claim 1 further comprising:
   updating extent annotation for an extent as changes are made in data stored in that extent.

4. The method of claim 1 wherein sizes of the extents are not equal to each other.

5. The method of claim 1 further comprising:
   selecting a proper size for a particular extent based on a kind of attribute the associated range of data refers to.

6. The method of claim 1 wherein sizes of the extents are equal to each other.

7. The method of claim 1 further comprising:
   dynamically selecting a size for the extents based on changes in a size of the database.

8. The method of claim 1 wherein the database is a materialized view of a database.

9. The method of claim 1 wherein an annotation on a range of data for an extent is co-located physically with that extent.

10. The method of claim 1 wherein the selected one or more extents are comprised of annotated sub-extents, and the step of searching the selected one or more extents further comprises:
selecting one or more sub-extents for which associated ranges of data may contain the desired data; and
searching the selected one or more sub-extents to locate the desired data.

11. The method of claim 10 wherein ranges of data associated with the sub-extents are based on one or more different attribute than attributes associated with ranges of data associated with the extents.

12. The method of claim 1 wherein a range of data based on one or more attributes associated with an extent has an associated annotation of a maximum and a minimum value.

13. The method of claim 1 wherein the database is a distributed database stored on one or more nodes.

14. The method of claim 1 wherein the ranges of data associated with the extents are stored in a table.

15. The method of claim 14 wherein selecting one or more extents further comprises:
selecting the one or more extents based on minimum and maximum values of ranges of data stored in the table.

16. The method of claim 1 wherein the step of selecting one or more extents further comprises:
generating an expression tree for locating the desired data in the database;
for each leaf node in the expression tree, selecting a set of prospective extents based on an expression associated with the leaf node and ranges of data associated with the extents;
at each parent node of the expression tree, combining sets of prospective extents from corresponding child nodes; and
searching resulting set of prospective extents at a root node to locate the desired data.

17. The method of claim 16 wherein the step of combining sets of prospective extents at each parent node further comprises:
combining the sets of prospective extents using a set-operator appropriate for an expression associated with the parent node.

18. The method of claim 17 wherein an expression associated with a parent node is a boolean operation and the appropriate set-operator is a set operator corresponding to the boolean operation.

19. The method of claim 1 further comprising:
generating nearly ordered map statistics.

20. The method of claim 1 further comprising:
determining whether to establish at least one nearly ordered map for an information space inside the database.

21. The method of claim 19 wherein the step of determining whether to establish nearly ordered maps for the particular information space further comprises:
identifying at least one column index in the information space as a candidate for a nearly ordered map.

22. The method of claim 21 wherein the step of identifying at least one column index as a candidate for a nearly ordered map further comprises:
identifying at least one candidate column index based on an associated column data type.

23. The method of claim 20 further comprising:
creating nearly ordered maps for all identified candidate column indexes.

24. The method of claim 20 wherein the step of determining whether to establish nearly ordered maps for the particular information space further comprises:
comparing data ranges of extents in the information space; and
determining if amount of overlap between data ranges of the extents in the information space is small enough to indicate a need for a nearly ordered map.

25. The method of claim 20 wherein the step of determining whether to establish nearly ordered maps for the particular information space further comprises:
determining if the information space is large enough to indicate a need for a nearly ordered map.

26. The method of claim 1, wherein the database comprises one or more distributed nodes storing one or more extents.

27. A computer-implemented system for locating desired data in a database, said system comprising:
a plurality of extents into which data in the database is divided;
an annotation for each extent specifying a range of data values contained in the extent, the range of data for each extent comprising one or more ranges of data based on one or more attributes;
a nearly-ordered map of extents
a nearly-ordered map selection module for selecting one or more extents for which associated ranges of data overlap at least partially with the data range for the desired data; and
a search module for searching the selected one or more extents which may contain the desired data.

28. The system of claim 27 wherein the database is a materialized view of a database.

29. The system of claim 27 wherein an annotation on a range of data for an extent is co-located physically with that extent.

30. The system of claim 27, wherein at least one extent comprises annotated sub-extents, and wherein the search module further comprises a module for selecting one or more sub-extents for which associated ranges of data may contain the desired data and searching the selected one or more sub-extents to locate the desired data.

31. The system of claim 27, further comprising:
at least one distributed database node storing one or more extents.

32. The system of claim 31, wherein the at least one distributed database node further comprises a search module for searching the extents stored therein.

33. The system of claim 31, wherein the at least one distributed database node further comprises a nearly ordered map of data stored on the distributed database node.

* * * * *